United States Patent [19]

Nishimura

[11] Patent Number: 5,093,166
[45] Date of Patent: Mar. 3, 1992

[54] LAMINATED RUBBER STRUCTURE

[75] Inventor: Kazuhiko Nishimura, Kasugai, Japan

[73] Assignee: Tokai Rubber Industries, Ltd., Japan

[21] Appl. No.: 529,479

[22] Filed: May 29, 1990

[30] Foreign Application Priority Data

May 29, 1989 [JP] Japan ................. 1-135623

[51] Int. Cl.$^5$ .................. F16L 11/04; B32B 27/08
[52] U.S. Cl. ...................... 428/36.2; 138/126; 138/137; 428/36.8; 428/420; 428/421
[58] Field of Search ............ 428/420, 36.8, 36.2, 428/421; 138/126, 137

[56] References Cited

U.S. PATENT DOCUMENTS

| | | | |
|---|---|---|---|
| 4,486,480 | 12/1984 | Okumoto et al. | 428/36.8 |
| 4,606,952 | 8/1986 | Sugimoto et al. | 428/36.8 |
| 4,806,351 | 2/1989 | Sugimoto et al. | 428/36.8 |
| 4,887,647 | 12/1989 | Igarashi et al. | 138/126 |

FOREIGN PATENT DOCUMENTS

| | | | |
|---|---|---|---|
| 0162335 | 9/1983 | Japan | 428/36.8 |
| 64-14029 | 1/1989 | Japan. | |
| 1-247157 | 10/1989 | Japan | 428/36.8 |

Primary Examiner—James J. Seidleck
Attorney, Agent, or Firm—Oliff & Berridge

[57] ABSTRACT

A laminated rubber structure having a first layer formed of a first rubber composition including a copolymer of tetrafluoroethylene, vinylidene fluoride, and hexafluoropropylene, the copolymer having at least one peroxide-crosslinking peroxide unit each bonded to a corresponding one of at least one end thereof, and containing 10 to 50 mole % of the vinylidene fluoride; and a second layer formed of a second rubber composition which includes an acrylonitrile-butadiene rubber containing 25 to 45 weight % of acrylonitrile, and a bifunctional crosslinking aid, the second layer contacting the first layer, the first and second layers being chemically bonded to each other by crosslinking caused between the copolymer and the acrylonitrile-butadiene rubber owing to the peroxide-crosslinking unit.

20 Claims, 1 Drawing Sheet

LAMINATED RUBBER STRUCTURE

BACKGROUND OF THE INVENTION

1. Field Of The Invention

The present invention relates in general to a laminated rubber structure and in particular to such a rubber structure or article suitable for a fuel conducting hose or other hoses, or a diaphragm, used in an automotive vehicle which structure is required to have excellent heat-resistant and gasoline-resistant characteristics.

2. Related Art Statement

There has conventionally been used a multi-layered or laminated rubber structure as a fuel transporting hose or a diaphragm for an automotive vehicle. For example, there is known a fuel transporting hose constituted by three layers superposed on each other, that is, a heat-resistant and gasoline-resistant inner tube, a weather-resistant outer tube, and a reinforcing fiber layer interposed between the inner and outer tubes.

Generally, the inner tube of the above-indicated hose is formed of acrylonitrile-butadiene rubber (NBR), while the outer tube is formed of chlorosulphonated polyethylene (CSM), chlorinated polyethylene (CPE), or epichlorohydrin rubber (CHC), so that the inner and outer tubes exhibit required heat resistance and gasoline resistance, and required weather resistance, respectively.

The trend, however, is toward that, for effectively regulating exhaust gas, gasoline or other automotive fuels are subjected to higher pressure and higher temperature. The engine room may be raised to more than 100° C. Thus, gasoline conducted through the fuel hoses tends to be oxidized due to the heat. Gasoline containing the thus formed peroxides is called "sour gasoline". The sour gasoline adversely affects the fuel hoses. For these reasons automotive fuel transporting hoses are required to have more excellent heat-resistant and gasoline-resistant characteristics.

Meanwhile, a fluororubber (FKM) is known as a material which meets the above-indicated requirements. The fluororubber exhibits satisfactory heat-resistant and gasoline-resistant characteristics. However, since the fluororubber has no double bond in its polymer, it is very difficult to cause crosslinking (chemical bonding) between the FKM and other rubbers such as NBR. In other words, it is very difficult to bond the FKM to other rubbers with sufficient bonding force.

For example, in the case where an inner tube of a fuel transporting hose a previously described is formed of FKM while an outer tube thereof is formed of another rubber, or in the case where the inner tube is constituted by two layers, namely, an inner layer formed of FKM and an outer layer formed of a cheaper rubber such as NBR, for reducing the amount of use of FKM and thereby lowering the cost of manufacture of the hose, there is some possibility that, while the hose is being used or in service, interlayer separation or peeling is caused at the interface between the inner and outer tubes or between the inner and outer layers of the inner tube. Thus, the quality of these hoses is not satisfactory, and the thickness of the FKM layer is restrictive to reduce. In other words, the conventional laminated rubber structure including the FKM layer is not sufficiently reliable.

In order to improve the interlayer bonding characteristics between the FKM layer and the other rubber layer, conventionally an additive has been used. For example, in the event that the FKM layer is bonded to an NBR layer, an appropriate combination of a metal oxide such as MgO or ZnO with an epoxy resin, silica, etc. is added to a rubber composition for forming the NBR layer, so as to improve the characteristics of the NBR layer. However, in this case, too, the bonding force produced is not satisfactory.

In Japanese Laid-Open Publication No. 64-14029 dated Jan. 18, 1989, the present inventor and others proposed to use a copolymer of tetrafluoroethylene, vinylidene fluoride, and hexafluoropropylene, the copolymer having at least one peroxide-crosslinking unit each bonded to a corresponding one of at least one end thereof and containing 10 to 50 mole % of the vinylidene fluoride, for improving the FKM layer and thereby enhancing the bonding force produced between the FKM layer and an associated rubber layer.

However, even the above-identified specific FKM needs to further be improved. In the event that the specific FKM is used together with a commonly used rubber such as NBR, a laminated rubber structure produced, namely, a new (non-deteriorated) article is capable of exhibiting in ambient air satisfactory bonding characteristics between the FKM and NBR layers. However, if the rubber structure is actually used as a hose or a diaphragm in an automotive engine room or the like, the bonding force produced is extremely reduced in a comparatively short period of use. In the case of a gasoline transporting hose, in particular, the interface bonding force is lowered due to swelling of the associated rubber layer of NBR or the like as a result of contacting and absorbing the gasoline, whereby interlayer separation tends to occur at the interface between the FKM layer and the other layer.

SUMMARY OF THE INVENTION

It is therefore an object of the present invention to provide a laminated rubber structure including a layer formed of fluororubber (FKM) and a layer formed of acrylonitrile-butadiene rubber (NBR) superposed on the FKM layer, which structure maintains excellent interlayer bonding characteristics for a long period of use.

The above object may be achieved by the present invention, which provides a laminated rubber structure comprising (a) a first layer formed of a first rubber composition including a copolymer of tetrafluoroethylene, vinylidene fluoride, and hexafluoropropylene, the copolymer having at least one peroxide-crosslinking unit each bonded to a corresponding one of at least one end thereof, and containing 10 to 50 mole % of the vinylidene fluoride, and (b) a second layer formed of a second rubber composition including an acrylonitrile-butadiene rubber containing 25 to 45 weight % of acrylonitrile, and a bifunctional crosslinking aid, the second layer contacting the first layer, the first and second layers being chemically bonded to each other by crosslinking caused between the copolymer and the acrylonitrile-butadiene rubber owing to the peroxide-crosslinking unit.

In the laminated rubber structure constructed as described above, the first (FKM) layer formed of the first (fluororubber, FKM) composition and the second (NBR) layer formed of the second (NBR) composition are chemically bonded to each other by crosslinking, namely, chemical bonding caused between the two layers.

Described in more detail, the crosslinking is caused by the peroxide-crosslinking units each bonded to the copolymer included in the first composition. At least one active peroxide-crosslinking unit is introduced into the first composition by being bonded to at least one end of the copolymer, so that the peroxide-crosslinking unit provides an origin (or starting point) for reaction with a double bond present in the NBR polymer (acrylonitrile-butadiene rubber) included in the second composition. In addition, the bifunctional crosslinking aid is added to the second composition so as to accelerate the crosslinking reaction.

The present laminated rubber structure exhibits excellent bonding characteristics at the interface between the first (FKM) layer and the second (NBR) layer, because the two layers are bonded to each other by crosslinking caused therebetween. Even in the event that the laminated rubber structure is used under a condition in which the rubber structure contacts gasoline, the interlayer bonding force is advantageously maintained for a long time and therefore the rubber structure serves with sufficient reliability.

In addition, the FKM layer of the present rubber structure is reduced in thickness to such an extent as to decrease the amount of use of the FKM polymer. Thus, according to the present invention, a laminated rubber structure which has excellent heat-resistant, gasoline-resistant and gasoline permeation-resistant characteristics, is produced at low cost.

DETAILED DESCRIPTION OF THE INVENTION

Figure 1:
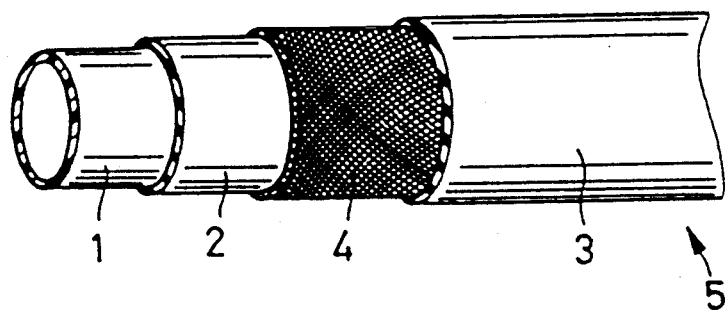
FIG. 1 is a view illustrating the construction of a fuel transporting hose whose inner tube is constituted by a laminated rubber structure in accordance with the present invention.

The above and optional features and advantages of the present invention will be better understood by reading the following detailed description of the invention.

The laminated rubber structure according to the present invention is by no means limited to a specific shape but may be formed into various shapes such as a plate and a cylinder. Referring to FIG. 1 there is shown a fuel transporting hose 5 whose inner tube 1, 2 is constituted by a laminated rubber structure in accordance with the present invention. The inner tube includes an inner layer 1 and an outer layer 2. The hose 5 further includes an outer tube 3 located radially outwardly of the inner tube 1, 2, and a reinforcing fiber layer 4 located between the inner and outer tubes.

The inner layer 1 of the hose 5 corresponds to a first or FKM layer of the laminated rubber structure. The inner layer 1 is formed of a first rubber (fluororubber or FKM) composition. The first composition includes a copolymer of tetrafluoroethylene, vinylidene fluoride, and hexafluoropropylene. This copolymer contains 10 to 50 mole % of the vinylidene fluoride. If the proportion of the vinylidene fluoride in the copolymer is less than the lower limit, 10 mole %, the first composition has excessively resinous characteristics. Consequently, the inner layer 1 formed thereof exhibits improved gasoline permeation resistance (i.e., resistance to permeation therethrough of gasoline), but simultaneously exhibits increased rigidity and lowered bonding force. Meanwhile, if the proportion of the vinylidene fluoride exceeds the upper limit, 50 mole %, the first composition exhibits excessively rubber characteristics, and it is very difficult to produce an extrudate of a sufficiently thin inner layer 1. It is most recommendable that the copolymer used in the first composition contain about 30 mole % of the vinylidene fluoride.

At least one peroxide-crosslinking unit is introduced into the first composition by being bonded to a corresponding one of at least one end of the above-indicated copolymer. It is preferred that the peroxide-crosslinking unit used be constituted by or derived from a one or two-iodine or bromine-substituted organic fluorine-containing compound having an electron attractive group and having no double bond. One or more of these compounds is/are used as a chain transfer agent in the copolymerization reaction of the three monomers (tetrafluoroethylene, vinylidene fluoride and hexafluoropropylene) for producing the copolymer. Described in more detail, first, the peroxide-crosslinking unit is bonded to one of the three monomers. Because of the chemical activity of the bond site on the monomer where the peroxide-crosslinking unit is bonded, random copolymerization progresses at the bond site, thereby producing a copolymer of the three monomers. In other words, the peroxide-crosslinking unit is at any time located at an end of the polymer chain and serves for bonding individual monomers to the polymer chain. As a result, is produced the copolymer of tetrafluoroethylene, vinylidene fluoride and hexafluoropropylene to an end of which the peroxide-crosslinking unit is bonded.

The peroxide-crosslinking unit may be constituted by or derived from a compound selected from the group consisting of perfluoroisopropyl iodide, perfluoroisopropyl bromide, 1,4-diiodoperfluorobutane, 1,4-dibromoperfluorobutane, 1,6-diiodoperfluorohexane, and 1,6-dibromoperfluorohexane.

Various known additives are added to the thus obtained copolymer so as to provide a desired first (fluororubber, FKM) composition. The additives include a crosslinking agent (described later). Meanwhile, the peroxide-crosslinking unit bonded to the copolymer in the fluororubber composition, maintains chemical activity even after the copolymerization of the individual monomers, namely, production of the copolymer. Under appropriate reaction conditions, crosslinking is caused between the fluororubber composition (or inner layer 1 formed thereof) and an NBR composition (or outer layer 2 formed thereof) as described later.

The outer layer 2 of the hose 5 corresponds to a second or NBR layer of the laminated rubber structure. The outer layer 2 is formed of a second rubber (NBR) composition. The NBR polymer included in the second composition contains 25 to 45 weight % of acrylonitrile. If the proportion of the acrylonitrile in the NBR polymer is less than the lower limit, 25 weight %, the second composition suffers from problems that the outer layer 2 formed thereof is subject to excessive volume change (swelling) as a result of contacting and absorbing gasoline and that the outer layer 2 possesses lowered mechanical strength. Meanwhile, if the proportion of the acrylonitrile exceeds the upper limit, 45 weight %, the outer layer 2 suffers from insufficient low temperature brittleness. It is recommended that, so long as the problem of the low temperature brittleness does not occur, the proportion of the acrylonitrile in the NBR polymer may be as large as possible for producing excellent bonding characteristics between the inner and outer layers 1, 2. It is therefore preferable to use an NBR polymer containing 30 to 35 weight % of acrylonitrile.

A bifunctional crosslinking aid is added as an essential additive to the NBR polymer when the second (NBR) composition is prepared. Furthermore, a crosslinking agent is added to the NBR composition. The bifunctional crosslinking aid serves for aiding the crosslinking agent in causing crosslinking of the NBR polymer. In addition, the bifunctional crosslinking aid exhibits a special effect for accelerating crosslinking between the copolymer of the fluororubber (FKM) composition and the NBR polymer of the NBR composition. Consequently, the inner and outer layers 1, 2 formed of the FKM and NBR compositions, respectively, are chemically bonded to each other with a sufficient bonding force. Thus, the inner tube 1, 2 is provided as the laminated rubber structure.

The bifunctional crosslinking aid may be selected from the group consisting of dimethacrylates such as ethylene glycol dimethacrylate, 1,3-buthylene glycol dimethacrylate, and diethylene glycol dimethacrylate; diacrylates such as 1,5-pentanediol diacrylate, neopentyl glycol diacrylate, 1,6-hexanediol diacrylate, and diethylene glycol diacrylate; divinyl monomers such as divinyl benzene; and diallyl compounds such as diallyl phthalate. It is recommended that the NBR composition contain 1 to 10 parts by weight of the bifunctional crosslinking aid per 100 parts by weight of the NBR polymer.

Various known additives are added to the NBR composition. The additives include one or more of a crosslinking agent, a processing aid, an antioxidant and a filler, and further include one or more of a softener, a plasticizer and a stabilizer as needed.

It is preferred that the crosslinking agent used in the second (NBR) composition is selected from peroxides. The crosslinking agent may be selected from the group consisting of dicumylperoxide, 1,1-di(t-butylperoxy)-3,3, 5-trimethylcyclohexane, 2,5-dimethyl-2,5-di(t-butylperoxy) hexane, 2,5-dimethyl-2,5-di(t-butylperoxy)hexyne-3,1, 3-di(t-butylperoxyisopropyl)benzene, and n-butyl-4,4, bis(t-butylperoxy)valerate. It is recommended that the NBR composition contain 0.5 to 10 parts by weight of the crosslinking agent per 100 parts by weight of the NBR polymer. One or more of these peroxides may be used as a crosslinking agent for the first (FKM) composition wherein the previously-described copolymer is included.

A liquid NBR may be added to the NBR composition for improving the bonding characteristics thereof. It is recommendable to use a liquid NBR having a molecular weight of 1,000 to 10,000, preferably 5,000 to 7,000. If the molecular weight of the liquid NBR is excessively large, the properties of the liquid NBR approximate those of the NBR polymer already present in the NBR composition. Meanwhile, if the molecular weight of the liquid NBR is excessively small, the liquid NBR volatilizes away during kneading or other process steps. Furthermore, it is recommendable to use a liquid NBR containing about 34 weight % of acrylonitrile. It is also recommendable that the NBR composition contain 1 to 20 parts by weight of the liquid NBR per 100 parts by weight of the NBR polymer. If the proportion of the liquid NBR is less than the lower limit, 1 part by weight, the liquid NBR no longer contributes to improving the bonding characteristics. Meanwhile, if the proportion of the liquid NBR exceeds the upper limit, 20 parts by weight, the mechanical strength of the outer layer 2 formed of the NBR composition is lowered while adhesiveness of the NBR composition is increased and the workability thereof is lowered.

The inner and outer layers 1, 2 of the inner tube in the fuel transporting hose 5 of FIG. 1 are formed of the fluororubber (FKM) composition and the NBR composition, respectively, which are prepared as described above. The thickness of each of the inner and outer layers 1, 2 is determined at an appropriate value depending upon the requirements thereto. In order to improve the resiliency of the hose 5 and reduce the cost of manufacture of the same 5, in particular, the thickness of the inner layer 1 is selected at 10 to 500 μm, preferably 100 to 300 μm, while the thickness of the outer layer 2 is selected at 1 to 2 mm.

The reinforcing fiber layer 4 is provided radially outwardly of the two-layer inner tube 1, 2 in a conventional manner. For example, the reinforcing fiber layer 4 is formed by braiding, spiralling or knitting a thread consisting essentially of a synthetic fiber such as vinylon fiber, polyester fiber or aramid fiber, or a natural fiber such as cotton fiber.

The outer tube 3 is provided outwardly of the reinforcing fiber layer 4 also in a conventional manner. For example, the outer tube 3 is formed of a commonly used material. From the viewpoint of weather resistance and oil resistance, the outer tube 3 is formed of CSM, CPE or CHC. The thickness of the outer tube 3 is selected at 0.7 to 1.5 mm.

The fuel transporting hose 5 is manufactured by a commonly used method. For example, the individual cylindrical layers 1, 2, 4, 3 are formed on each other on a mandrel, an the superposed layers 1, 2, 4, 3 are subjected to crosslinking reaction for producing an integrally bonded tubular body, namely, the hose 5 as an end product. Thereafter, the mandrel is withdrawn from the hose 5.

In the fuel transporting hose 5 produced as described above, the inner and outer layers 1, 2 of the inner tube are chemically bonded to each other by the crosslinking caused between the FKM polymer (copolymer) of the FKM composition and the NBR polymer of the NBR composition thanks to the peroxide-crosslinking unit bonded to the FKM polymer. Therefore, the hose 5 exhibits excellent bonding characteristics for a long period of use. Thus, the hose 5 is used with high reliability. In addition, the inner layer 1 (FKM layer) is reduced in thickness to a sufficient extent, without sacrificing the excellent bonding characteristics of the hose 5. Consequently, the fuel transporting hose 5 is improved with respect to resiliency, and the cost of manufacture of the hose 5 is reduced.

There will be described some examples in accordance with the present invention for further clarifying the principles of the present invention. However, it is to be understood that the present invention is by no means limited to the particular details of these examples.

EXAMPLES

NBR Compositions, No. 1 through No. 7, are prepared as indicated in TABLE I. The proportion of acrylonitrile (AN) in the NBR polymer used in each example No. 1-7 is determined at one of five values, 22, 28, 31, 41 and 50 weight %. The proportions, 22 and 50 weight %, are out of the proportion range in accordance with the present invention, and therefore examples No. 2 and No. 3 serve as comparative examples. Dicumylperoxide, a crosslinking agent, is added to all examples. Ethylene glycol dimethacrylate, a bifunctional crosslinking aid, is added to examples No. 2 though No. 7, while triallylisocyanurate, a trifunctional compound, is added to the last example No. 1. Thus, example No. 1 is used as a comparative example.

Each example, No. 1 through No. 7, is tested with respect to general properties, gasoline resistance (rate of change in volume after being immersed in gasoline (Fuel C) at 40° C. for 48 hours), and low temperature brittleness, according to K-6301 of JIS (Japanese Industrial Standard). The test results are indicated in TABLE I.

|  | parts by weight |
|---|---|
| FKM polymer* | 100 |
| MT Carbon black | 25 |
| Triallylisocyanurate | 2 |
| Crosslinking agent (2, 5-dimethyl-2, 5-di(t-butylperoxy)hexane) | 0.8 |

*The FKM polymer is obtained by polymerizing a monomer mixture consisting of 40 mole % of tetrafluoroethylene, 30 mole % of vinylidene fluoride and 30 mole % of hexafluoropropylene, and the monomer mixture contains 0.5 part by weight of 1, 4-diiodoperfluorobutane (peroxide-crosslinking unit) per 100 parts by weight of the three monomers.

TABLE I

| | EXAMPLES (NBR COMPOSITIONS) No. | | | | | | |
|---|---|---|---|---|---|---|---|
| | 1 | 2 | 3 | 4 | 5 | 6 | 7 |
| NBR Composition (parts by weight) | | | | | | | |
| NBR Polymer | | | | | | | |
| AN 50% | — | 100 | — | — | — | — | — |
| AN 41% | 100 | — | — | — | 100 | 100 | — |
| AN 31% | — | — | — | — | — | — | 100 |
| AN 28% | — | — | — | 100 | — | — | — |
| AN 22% | — | — | 100 | — | — | — | — |
| Stearic acid | 1 | 1 | 1 | 1 | 1 | 1 | 1 |
| ZnO | 5 | 5 | 5 | 5 | 5 | 5 | 5 |
| MgO | 5 | 5 | 5 | 5 | 5 | 5 | 5 |
| Silica | 20 | 20 | 20 | 20 | 20 | 20 | 20 |
| CaCO$_3$ | 30 | 30 | 30 | 30 | 30 | 30 | 30 |
| FEF Carbon black | 30 | 30 | 30 | 30 | 30 | 30 | 30 |
| Plasticizer*[1] | 15 | 15 | 15 | 15 | 15 | 15 | 15 |
| Liquid NBR | — | 5 | 5 | 5 | — | 5 | 5 |
| Triallylisocyanurate | 3 | — | — | — | — | — | — |
| Ethylene glycol dimethacrylate | — | 2.5 | 2.5 | 2.5 | 2.5 | 2.5 | 2.5 |
| Dicumylperoxide | 1.2 | 1.2 | 1.2 | 1.2 | 1.2 | 1.2 | 1.2 |
| Properties | | | | | | | |
| $T_B$*[2] (kgf/cm$^2$) | 140 | 173 | 163 | 180 | 160 | 158 | 174 |
| $E_B$*[3] (%) | 300 | 420 | 150 | 220 | 250 | 430 | 330 |
| $H_S$*[4] (°) | 64 | 58 | 73 | 68 | 65 | 59 | 60 |
| Gasoline resistance ($\Delta V$, %) | 27 | 10 | 110 | 73 | 26 | 22 | 45 |
| Low temperature brittleness (°C.) | −25 | −17 | −44 | −38 | −24 | −27 | −32 |

*[1]Dioctylphthalate
*[2]Tensile strength
*[3]Elongation
*[4]Spring hardness

As is apparent from the test results indicated in TABLE I, comparative example No. 3 wherein the proportion of acrylonitrile in the NBR polymer thereof is less than the lower limit of the proportion range in accordance with the present invention, suffers from the problem of excessively large change in volume (swelling) as a result of contacting and absorbing gasoline. Consequently, there is high possibility that interlayer separation occurs at the interface between a layer formed of the NBR composition (example No. 3) and an associated layer formed of a different material. Meanwhile, comparative example No. 2 wherein the proportion of acrylonitrile in the NBR polymer thereof exceeds the upper limit of the proportion range in accordance with the present invention, suffers from the problem of insufficient low temperature brittleness (i.e., excessively high brittleness temperature).

Next, a fluororubber (FKM) composition in accordance with the present invention is prepared as follows:

The FKM composition is used in a well-known extruding process, for forming a first (FKM) layer, and subsequently the NBR compositions, No. 1, No. 5 and No. 6 of TABLE I, are used for forming a second (NBR) layer on the first layer. Thus, laminated structures are produced. Thereafter, crosslinking reaction is caused between the FKM and NBR layers of each laminated structure so as to provide an integrally bonded sheet member.

Each of the thus obtained sheet members is tested with respect to gasoline permeation resistance, and interlayer bonding force (at times before and after being immersed in gasoline (Fuel C) at 42° C. for 72 hours). Measurement of the interlayer bonding force is carried out according to the previously indicated JIS K-6301. Meanwhile, measurement of the gasoline permeation resistance is carried out by pouring 100 cc of Fuel C in a cup-like stainless steel jig, covering the jig with a test piece obtained from each sheet member, and inverting upside down the jig covered with the test piece, and measuring an amount of change in weight (namely, amount of permeation of the gasoline) after a lapse of a predetermined time at normal temperature. In TABLE II, the test results are indicated together with the construction of each of the sheet members tested.

TABLE II

| | No. | | | |
|---|---|---|---|---|
| | Invention examples | | | Com.*[1] |
| | 1 | 2 | 3 | 4 |
| FKM Layer (mm) | 0.2 | 0.2 | 0.5 | 0.2 |
| NBR Layer | | | | |
| Composition | No. 5 | No. 6 | No. 5 | No. 1 |
| Thickness (mm) | 1.8 | 1.8 | 1.5 | 1.8 |
| Bonding force (kgf/inch) | | | | |
| Before immersion | 11.8 | 15.0 | 10.9 | 4.5 |
| After immersion | 8.4 | 11.3 | 7.3 | 1.2 |
| Gasoline permeation resistance (mg · mm/cm$^2$ · day) | 2.2 | 2.3 | 1.1 | 2.3 |

*[1]Comparative example

As is apparent from the test results indicated in TABLE II, all the examples, No. 1, No. 2 and No. 3, in accordance with the present invention exhibit an extremely high interlayer bonding force not only at the point of time before being immersed in gasoline, but also the point of time after having been immersed in gasoline. In contrast thereto, comparative example No. 4 wherein the NBR composition No. 1 (TABLE I) is used for forming the NBR layer, suffers from the problem of insufficient interlayer bonding force.

Thus, it is understood that a laminated rubber structure in accordance with the present invention is used with high reliability. In addition, the FKM layer is reduced in thickness to such an extent as to improve the resiliency of the laminated rubber structure, and thus the cost of manufacture of the rubber structure is lowered.

While the present invention has been described in the illustrative manner, it is to be understood that the present invention may be embodied with various changes, modifications and improvements that may occur to those skilled in the art without departing from the spirit and scope of the invention defined in the appended claims.

What is claimed is:

1. A laminated rubber structure comprising:
    a first layer formed of a first rubber composition including a copolymer of tetrafluoroethylene, vinylidene fluoride, and hexafluoropropylene, said copolymer having at least one peroxide-crosslinking unit each bonded to a corresponding one of at least one end thereof, and containing 10 to 50 mole % of said vinylidene fluoride; and
    a second layer formed of a second rubber composition including an acrylonitrile-butadiene rubber containing 25 to 45 weight % of acrylonitrile, and a bifunctional crosslinking aid, said second layer contacting said first layer,
    said first and second layers being chemically bonded to each other by crosslinking caused between said copolymer and said acrylonitrile-butadiene rubber owing to said peroxide-crosslinking unit.

2. The rubber structure according to claim 1, wherein said copolymer contains 30 mole % of said vinylidene fluoride.

3. The rubber structure according to claim 1, wherein said peroxide-crosslinking unit is derived from a one or two-iodine or bromine-substituted organic fluorine-containing compound having no double bond.

4. The rubber structure according to claim 2, wherein said peroxide-crosslinking unit is derived from a compound selected from the group consisting of perfluoroisopropyl iodide, perfluoroisopropyl bromide, 1, 4-diiodoperfluorobutane, 1,4-dibromoperfluorobutane, 1, 6-diiodoperfluorohexane, and 1,6-dibromoperfluorohexane.

5. The rubber structure according to claim 1, wherein said acrylonitrile-butadiene rubber contains 30 to 35 weight % of said acrylonitrile.

6. The rubber structure according to claim 1, wherein said bifunctional crosslinking aid is selected from the group consisting of dimethacrylates such as ethylene glycol dimethacrylate, 1,3-butylene glycol dimethacrylate, and diethylene glycol dimethacrylate; diacrylates such as 1,5-pentanediol diacrylate, neopentyl glycol diacrylate, 1,6-hexanediol diacrylate, and diethylene glycol diacrylate; divinyl monomers such as divinyl benzene; and diallyl compounds such as diallyl phthalate.

7. The rubber structure according to claim 1, wherein said second composition contains 1-10 parts by weight of said bifunctional crosslinking aid per 100 parts by weight of said acrylonitrile-butadiene rubber.

8. The rubber structure according to claim 1, wherein said second composition further includes a liquid NBR.

9. The rubber structure according to claim 1, wherein said second composition further includes at least one crosslinking agent.

10. The rubber structure according to claim 1, wherein said second composition further includes at least one softener.

11. The rubber structure according to claim 9, wherein said crosslinking agent is selected from the group consisting of dicumylperoxide, 1, 1-di(t-butylperoxy)-3,3,5-trimethylcyclohexane, 2, 5-dimethyl-2,5-di(t-butylperoxy)hexane, 2,5-dimethyl-2, 5-di(t-butylperoxy)hexyne-3,1,3-di(t-butylperoxyisopropyl) benzene, and n-butyl-4,4, bis(t-butylperoxy)valerate.

12. The rubber structure according to claim 9, wherein said second composition contains 0.5 to 10 parts by weight of said crosslinking agent per 100 parts by weight of said acrylonitrile-butadiene rubber.

13. A rubber hose comprising:
    an inner tube;
    an outer tube located radially outwardly of said inner tube; and
    a reinforcing fiber layer interposed between said inner and outer tubes, such that said inner and outer tubes and said reinforcing fiber layer cooperate with each other to provide an integrally bonded tubular body,
    said inner tube including
    an inner layer formed of a first rubber composition including a copolymer of tetrafluoroethylene, vinylidene fluoride, and hexafluoropropylene, said copolymer having a peroxide-crosslinking unit bonded to an end thereof, and containing 10 to 50 mol % of said vinylidene fluoride; and
    an outer layer located radially outwardly of said inner layer, said outer layer being formed of a second rubber composition including an acrylonitrile-butadiene rubber containing 25 to 45 weight % of acrylonitrile, and a bifunctional crosslinking aid, said outer layer contacting said inner layer, said inner and outer layers being chemically bonded to each other by crosslinking caused between said copolymer and said acrylonitrile-butadiene rubber owing to said peroxide-crosslinking unit.

14. The hose according to claim 13, wherein said inner layer has a thickness of 10 to 500 μm, while said outer layer has a thickness of 1 to 2 mm.

15. The hose according to claim 14, wherein said inner layer has a thickness of 100 to 300 μm.

16. The rubber structure according to claim 1, wherein said second composition includes at least one processing aid.

17. The rubber structure according to claim 1, wherein said second composition includes at least one antioxidant.

18. The rubber structure according to claim 1, wherein said second composition includes at least one filler.

19. The rubber structure according to claim 1, wherein said second composition includes at least one plasticizer.

20. The rubber structure according to claim 1, wherein said second composition includes at least one stabilizer.

* * * * *